F. W. WAKEFIELD.
VEHICLE LAMP.
APPLICATION FILED JULY 7, 1917.
1,369,756.
Patented Feb. 22, 1921.
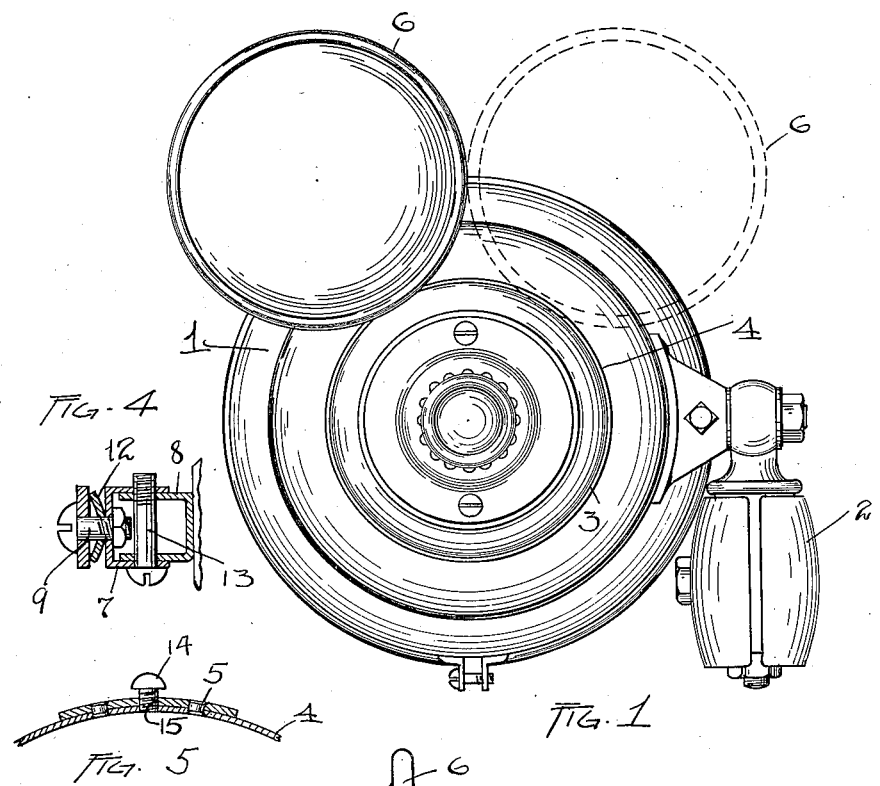
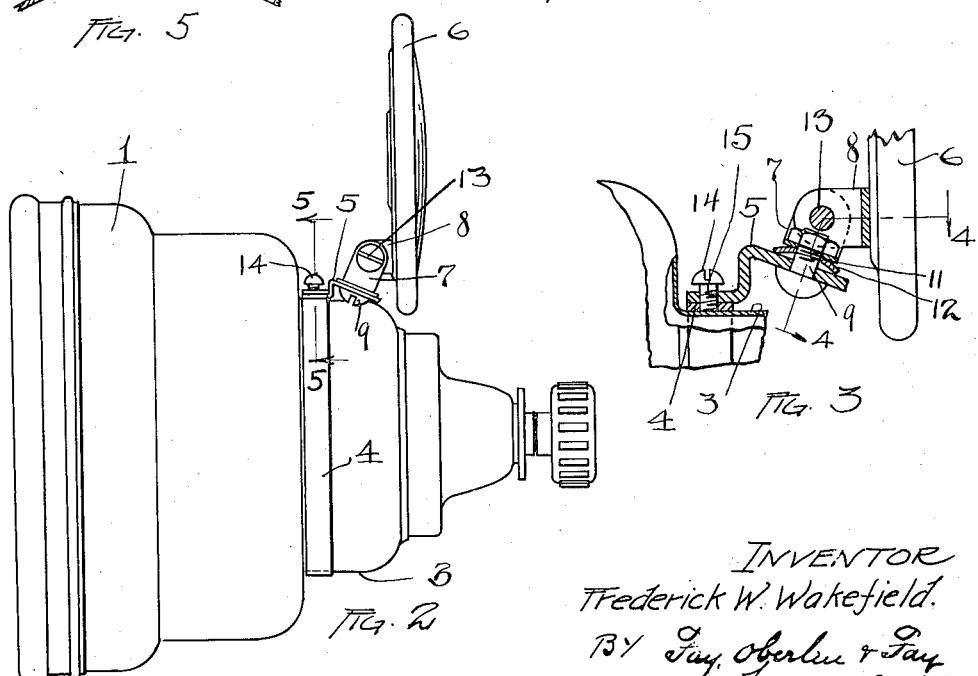
INVENTOR
Frederick W. Wakefield.
BY Fay, Oberlin & Fay
ATTORNEYS

UNITED STATES PATENT OFFICE.

FREDERICK W. WAKEFIELD, OF VERMILION, OHIO, ASSIGNOR TO THE F. W. WAKE-FIELD BRASS COMPANY, OF VERMILION, OHIO, A CORPORATION OF OHIO.

VEHICLE-LAMP.

1,369,756.   Specification of Letters Patent.   Patented Feb. 22, 1921.

Application filed July 7, 1917. Serial No. 179,231.

*To all whom it may concern:*

Be it known that I, FREDERICK W. WAKE-FIELD, a citizen of the United States, and a resident of Vermilion, county of Erie, and State of Ohio, have invented a new and useful Improvement in Vehicle-Lamps, of which the following is a specification, the principle of the invention being herein explained, and the best mode in which I have contemplated applying that principle, so as to distinguish it from other inventions.

The present invention relates to improvements in supporting means for mirrors, and more particularly to means for mounting the small mirrors which are generally attached to the spot lights commonly used on automobiles, to permit the driver to obtain a view of the traffic behind him. Another object is to provide a simple and convenient means for positioning the mirror about the circumference of a lamp casing to permit the lamp to be used on either the right or the left-hand side of an automobile, and still mount the mirror at the correct angle to allow the driver to obtain the desired view of the traffic. Means are also provided to allow the mirror to be adjusted both vertically and horizontally for different heights and positions of the lamp. To the accomplishment of the foregoing and related ends, said invention, then, consists of means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a rear elevation of a spot-light with my improved support for mirrors thereon and showing in dotted lines one of the various other positions in which the mirror may be placed about its circumference of the casing; Fig. 2 is a side elevation of a lamp with the device in place; Fig. 3 is a vertical section through the mirror support showing the means provided for the vertical and horizontal movement of the mirror and also the means for retaining the support on the casing; Fig. 4 is a section on the line 4—4, Fig. 3; and Fig. 5 is a section on the line 5—5, Fig. 2.

As illustrated, a spot light or lamp 1 is shown, having the usual supporting means consisting of a clamp 2 adapted to be attached to a wind shield frame or the like, and the lamp is adjustably attached to this clamp about both a vertical and a horizontal axis. The lamp casing is provided with a step 3 which is adapted to be encircled by a ring or band 4, to which is permanently fastened a supporting bracket 5.

The mirror, which is suitably mounted in a frame 6, is adjustably mounted on the bracket 5 by means of a universal, movable support which consists of two substantially U-shaped members 7 and 8. One of these members 7 is adjustably secured to the bracket by means of a bolt or pin 9 which passes through the bracket and apertures 11 formed in the U-shaped member. Surrounding this pin between the bracket and the member is mounted a spring washer 12 which is adapted to tend to restrain movement between the two. The second U-shaped member 8 is rigidly attached to the mirror frame and is adapted to fit within the first mentioned U-shaped member 7, and these two members have alined apertures through which a bolt or pin 13 is passed to obtain a movable mounting between the two. A set screw 14 or the like is mounted in a threaded aperture 15 in the ring 4, and is adapted to be screwed tightly against the lamp casing to hold the mirror in any desired circumferential position.

Heretofore it has been the usual practice to either permanently mount the mirror directly in the casing of the lamp, or else to adjustably support it from the lamp casing. When so mounted the spot light or lamp can be used only on one side of the vehicle, and can be mounted in practically only one position if the mirror is to be correctly positioned. By means of my present mounting the mirror can be correctly positioned whether the lamp is mounted on the left or the right-hand side of the vehicle, and can be moved around the lamp to position it at the correct height, which will of course depend upon the height of the lamp. The present supporting means are very simple in their construction, and can be readily adapted to any type of lamp which has a stepped casing.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a mirror mounting for vehicle lamps the combination of a lamp casing, a mirror, a ring movably mounted on said casing about the longitudinal axis of the same, universal joint connection between said ring and mirror and means for retaining said ring in adjusted position around said casing.

2. In a mirror mounting for vehicle lamps, the combination of a lamp casing, having a flat annular portion, a mirror, a ring revolubly mounted on said annular portion of said casing, universal joint connection between said ring and mirror and means for retaining said ring in adjusted position on said casing.

3. In a mirror mounting for vehicle lamps, the combination of a lamp casing having a flat annular portion, a mirror, a ring revolubly mounted on said annular portion of said casing, universal joint connection between said ring and said mirror, and a set screw for retaining said ring in adjusted position on said casing.

Signed by me, this 5th day of July, 1917.

FREDERICK W. WAKEFIELD.